Aug. 9, 1932.  E. E. DRAPER  1,870,611
PLATE HOLDER FOR STEREOSCOPIC CAMERAS
Filed April 24, 1931  4 Sheets-Sheet 1
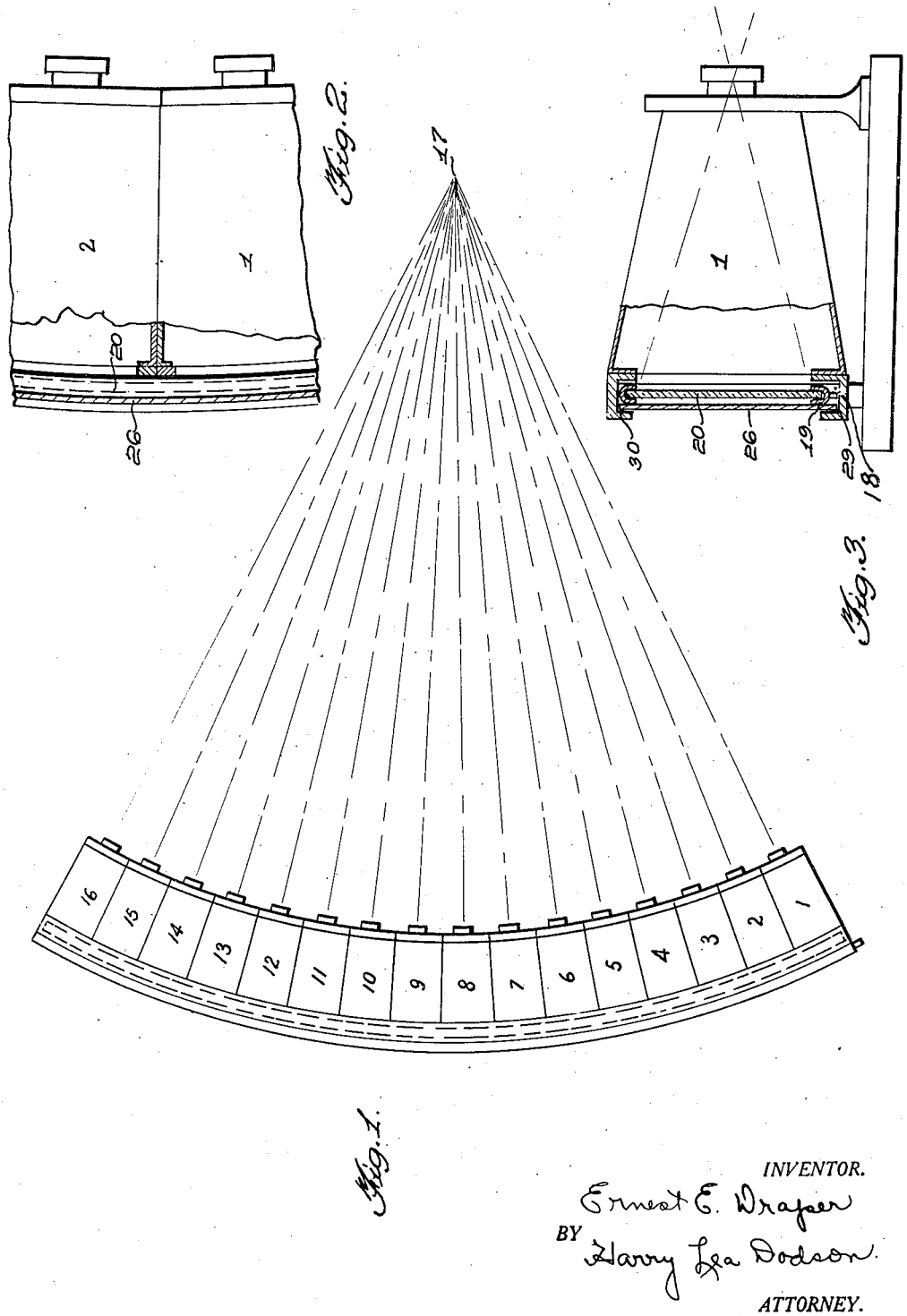
INVENTOR.
Ernest E. Draper
BY Harry Lea Dodson
ATTORNEY.

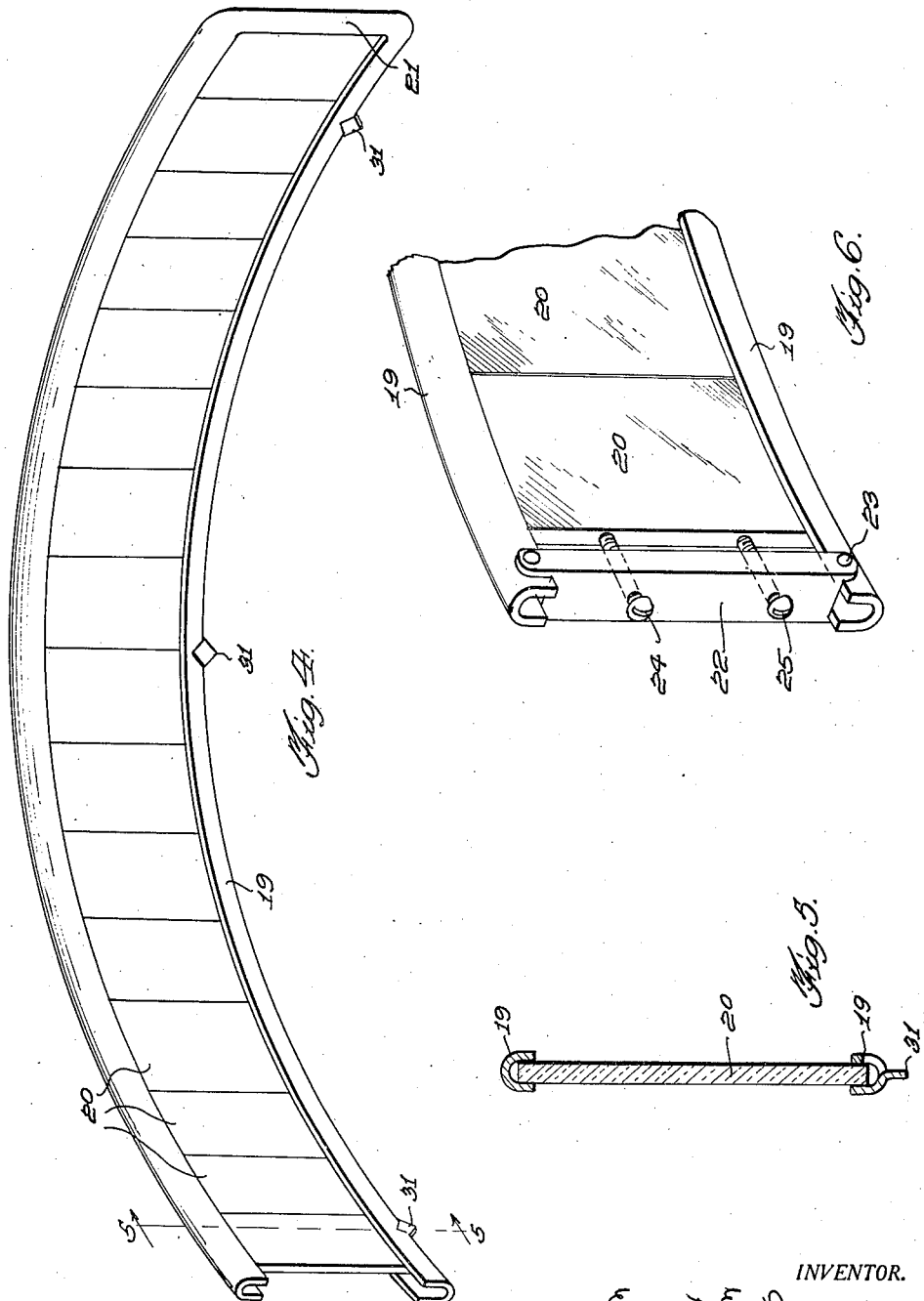

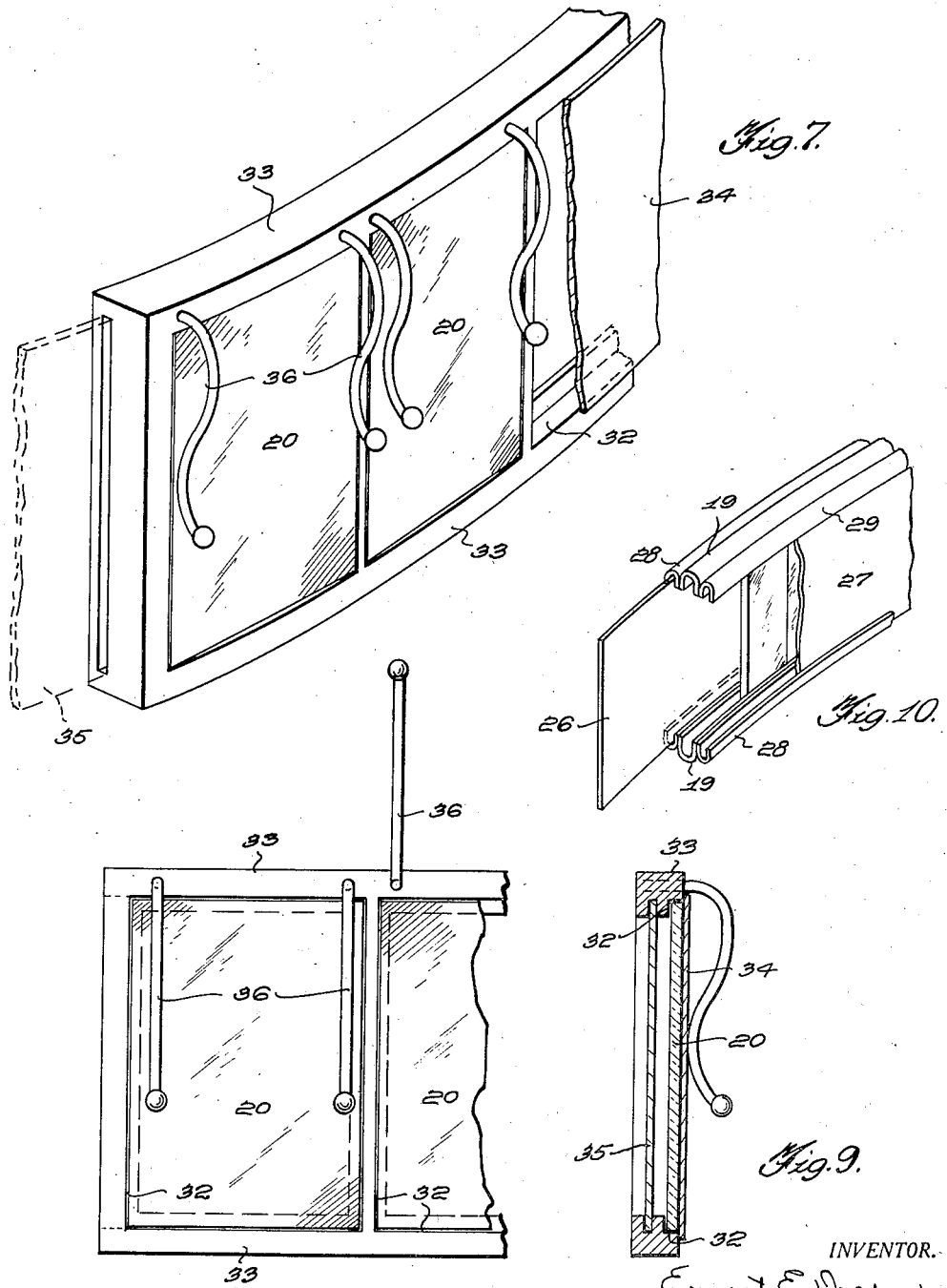

Aug. 9, 1932. E. E. DRAPER 1,870,611
PLATE HOLDER FOR STEREOSCOPIC CAMERAS
Filed April 24, 1931 4 Sheets-Sheet 4
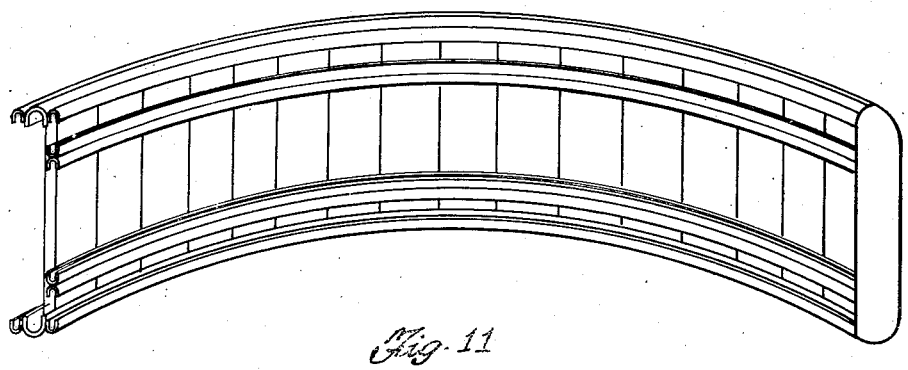
Fig. 11
Fig. 13
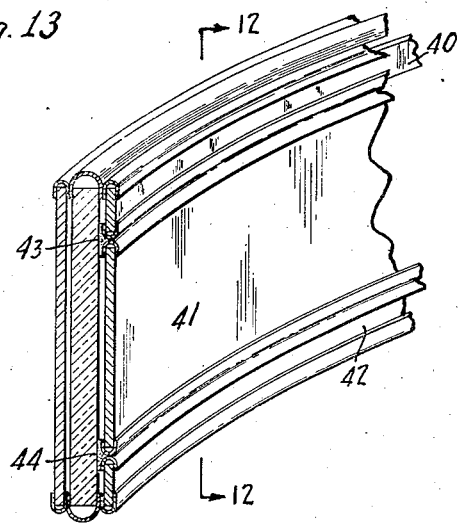
Fig. 12
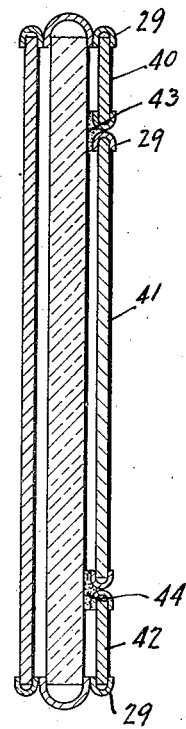
INVENTOR
Ernest E. Draper
BY
Harry Lea Dodson.
ATTORNEY Patented Aug. 9, 1932

1,870,611

UNITED STATES PATENT OFFICE

ERNEST E. DRAPER, OF SCARSDALE, NEW YORK, ASSIGNOR TO THE PERSER CORPORATION, OF NEW YORK, N. Y., A CORPORATION OF NEW YORK

PLATE HOLDER FOR STEREOSCOPIC CAMERAS

Application filed April 24, 1931. Serial No. 532,521.

My invention relates to that class of cameras such as are described in my copending application, Serial No. 532,522 filed April 24, 1931, in which a multiplicity of cameras having matched lenses of equal focal length are arranged in the arc of a circle all having a common center which is to be occupied by the object to be photographed. After simultaneous exposure the plates are replaced in the cameras and projected onto a sensitized plate through a line screen to make a composite positive. Great care and precaution must be exercised to ensure that when the negatives are replaced in the cameras that they occupy the identical position which they did at the time of the exposure in order to ensure correct registration in the absence of which the positive will be ruined.

My invention has for its object to provide a special plate holder in which the plates can all be mounted before exposure and securely fastened and in which the plates are developed without removal from the holder so that when the plate holder is returned to the camera the plates must be in their original position.

My means of accomplishing the foregoing objects may be more readily understood by having reference to the accompanying drawings, in which—

Fig. 1 is a top or plan view of a stereoscopic camera of the type referred to with my improved plate holder;

Fig. 2 is a fragmentary horizontal sectional view;

Fig. 3 is a similar view in vertical section;

Fig. 4 is a perspective view of the plate holder by itself with the plates in position;

Fig. 5 is a sectional view taken on the line 5—5 in Fig. 4;

Fig. 6 is a detail view showing the means for locking the plates in the holder;

Fig. 7 shows a modified form of plate holder;

Fig. 8 is a detail view of the holder shown in Fig. 7, showing how the plates are inserted or removed;

Fig. 6 is a vertical section of the same;

Fig. 10 is a fragmentary detail view of the plate holder with the opaque slides or shutters for making the holder light tight;

Fig. 11 is a perspective view showing a modified form of plate holder;

Fig. 12 is a sectional view taken on the line 12—12 in Fig. 13; and

Fig. 13 is a fragmentary detail view of the plate holder with the opaque slides or shutters for making the holder light tight.

Similar reference numerals refer to similar parts throughout the entire description.

As shown in the drawings a multiplicity of cameras 1 to 16 are mounted in the arc of a circle, the center 17 of which should be occupied by the approximate center of the object to be photographed. In the back of the camera is a groove 18 adapted to receive the plate holder 19 which is formed by an arcuate channel into which the plates 20 slide. When the holder is loaded in the dark room the plates are forced edge to edge until the first one abuts the end 21 of the holder 19, they are then locked in place in any suitable manner. In Fig. 6 I have shown a lock 22 secured to the plate holder 19 by a pivot pin 23. Screws 24 and 25, the inner ends of which abut the edge of the plate 20 so that by tightening the screws all loose motion between the plates can be taken up and the plates locked tightly and securely in the holder 19. Flexible opaque slides 26 and 27 are then inserted in channels 28 and 29, secured to each side of the plate holder 19, to render the plate holder light tight. If desired the camera may be loaded in the dark room in which case the slide 27 is omitted and the holder 19 is slid into the groove 18 and the flexible opaque shutter or slide is inserted into grooves 29 and 30 formed in the camera. After the plates have been exposed the slide 27, having been removed for that purpose, is replaced and the holder is taken into the dark room where both slides 26 and 27 are removed and the plate holder, lock and plates are immersed in the developer. The entire process of development—fixing, washing and drying is carried on without removing the plates from the holder. Preferably the holder and its parts are made of Monel metal or some other material unaffected by photographic chemicals or it may be coated with such a metallic coating. The holder is then returned to the camera and locked in place which insure its being returned to the exact position it occupied during the exposure. It may be found desirable to provide a number of tongues 31 on the holder 19 on which it can rest when in the groove 18 in the camera. These can conveniently be struck out of the channel 19 when it is being formed. In Figs. 7, 8 and 9, I show a different form of plate holder. Here I provide a series of pockets 32 formed in the plate holder 33 into which the plates 20 are fitted. This holder 33 is also arcuate in form and fits a groove, formed to receive it in the camera. Each pocket is spaced to correctly register with the corresponding lens. Opaque flexible slides 34 and 35 serve to render the holder light tight. A number of springs 36 are arranged on the holder to press the plates 20 into the pockets 32 and to hold them there during the development work in the dark room. Obviously in this manner, when the holder is again returned to the camera, the correct registration of plate and lens is maintained. It is highly desirable in devices of this kind to make provision for some means for insuring correct registration in the making of the positives. Means for accomplishing this is shown in my copending application, Serial No. 532,522 in which a plumb line is suspended above the center of the plate to be occupied by the object to be photographed. This plumb line is first exposed on the plate above and below the space to be occupied by the object which is to be photographed. After this has been done the remainder of the plate is exposed.

In Figs. 11 to 13 inclusive, I have shown a plate holder constructed with this apparatus in which the opaque slide is formed in three parts—40, 41 and 42—which are separably removable from the plate holder being slidable in grooves 29. It may be found desirable in practice to provide velvet packing 43 and 44 so as to prevent the light reaching the plates when the opaque flexible slides or shutters 40 and 42 are removed. When these slides are removed it will be apparent that a space at the top and bottom of the plate will be exposed on which will be formed the image of the plumb line. These shutters or slides are then replaced and the slide 41 is removed and the cameras are then ready to take the picture. When the negatives are developed there will appear an image of the plumb line both above and below the photograph and as explained in my application above referred to, permits accurate registration in the formation of the positives for the stereoscopic picture.

Having described my invention what I regard as new and desire to secure by Letters Patent is:

1. A plate holder for stereoscopic cameras comprising an arcuate channel adapted to receive a plurality of photographic plates, grooves on each side of said holder, flexible opaque slides in said grooves and means to lock said plates in said grooves.

2. A plate holder for stereoscopic cameras comprising an arcuate channel adapted to receive a plurality of photographic plates, said holder being fitted to a groove formed in a camera composed of a plurality of cameras each having its own lens, and means for making said holder light tight.

3. A plate holder for stereoscopic cameras comprising an arcuate channel adapted to receive a plurality of photographic plates, grooves on each side of said holder, flexible opaque slides in said grooves and means to lock said plates in said grooves, said means comprising a lock secured to said holder, screws in said lock, the inner ends of which abut the edge of a plate in said holder.

4. A plate holder for stereoscopic cameras comprising an arcuate channel adapted to receive a plurality of photographic plates, grooves on each side of said holder, flexible opaque slides in said grooves and means to lock said plates in said grooves, said means comprising a lock pivotally secured to said holder, screws in said lock, the inner ends of which abut the edge of a plate in said holder.

5. A plate holder for stereoscopic cameras comprising an arcuate channel adapted to receive a plurality of photographic plates, grooves on each side of said holder, flexible opaque slides in said grooves and means to lock said plates in said grooves, said holder and lock being formed of material unaffected by photographic chemicals.

6. A plate holder for stereoscopic cameras comprising an arcuate member having a plurality of spaced pockets adapted to receive plates for each lens in the camera, grooves on each side of said member, opaque flexible slides fitted to said grooves and means to hold said plates in said pockets.

7. A plate holder for stereoscopic cameras comprising an arcuate member adapted to receive and hold rigidly in position, a plurality of photographic plates and means to lock said plates in said holder.

8. A plate holder for stereoscopic cameras comprising an arcuate channel adapted to receive a plurality of photographic plates, grooves on each side of said holder, a flexible opaque slide in one of said grooves and a plurality of flexible opaque slides in the other.

9. A plate holder for stereoscopic cameras comprising an arcuate channel adapted to receive a plurality of photographic plates, grooves on each side of said holder, flexible opaque slides in said groves, means to lock said plates in said channel, and means for making said slides light tight.

10. A plate holder for stereoscopic cameras comprising an arcuate channel adapted to receive a plurality of photographic plates, said holder being fitted to a groove formed in a camera composed of a plurality of cameras each having its own lens, and means for making said holder light tight, and means to lock said plates in said grooves.

11. A plate holder for stereoscopic cameras comprising an arcuate member having a plurality of spaced pockets adapted to receive plates for each lens in the cameras, grooves on each side of said member, and opaque flexible slides fitted to said grooves, springs to hold said plates in said pockets.

12. A plate holder for stereoscopic cameras comprising an arcuate member having a plurality of spaced pockets adapted to receive plates one pocket for each lens in the camera, grooves on each side of said member, opaque flexible slides fitted to said grooves and means to hold said plates in said pockets, said holder and springs being formed of metal unaffected by photographic chemicals.

13. A plate holder for stereoscopic cameras comprising an arcuate channel adapted to receive a plurality of photographic plates, means to lock said plates in said holder and detachable means to render said holder light tight.

14. A plate holder for stereoscopic cameras comprising an arcuate channel adapted to receive a plurality of photographic plates, means to lock said plates in said holder and detachable means to render said holder light tight, said lock and holder being formed of suitable material to resist the action of photographic chemicals.

ERNEST E. DRAPER.